(12) United States Patent
Painter

(10) Patent No.: US 9,581,445 B2
(45) Date of Patent: Feb. 28, 2017

(54) TORSIONAL RATE MEASURING GYROSCOPE

(75) Inventor: Chris Painter, Dublin, CA (US)

(73) Assignee: Systron Donner Inertial, Inc., Concord, CA (US)

(*) Notice: Subject to any disclaimer, the term of this patent is extended or adjusted under 35 U.S.C. 154(b) by 175 days.

(21) Appl. No.: 14/405,746

(22) PCT Filed: Jun. 4, 2012

(86) PCT No.: PCT/US2012/040673
§ 371 (c)(1),
(2), (4) Date: Dec. 17, 2014

(87) PCT Pub. No.: WO2013/184084
PCT Pub. Date: Dec. 12, 2013

(65) Prior Publication Data
US 2015/0114115 A1    Apr. 30, 2015

(51) Int. Cl.
*G01C 19/5607*    (2012.01)
*G01C 19/5642*    (2012.01)
(Continued)

(52) U.S. Cl.
CPC ......... *G01C 19/5607* (2013.01); *G01C 19/56* (2013.01); *G01C 19/5642* (2013.01);
(Continued)

(58) Field of Classification Search
CPC ............ G01C 19/5712; G01C 19/5719; G01C 19/5628; G01C 19/5607; G01C 19/5769; G01C 19/5642; G01P 1/023
(Continued)

(56) References Cited

U.S. PATENT DOCUMENTS 4,930,351 A    6/1990  Macy et al.
5,038,613 A *  8/1991  Takenaka .......... G01C 19/5607
                                                    73/493
(Continued)

FOREIGN PATENT DOCUMENTS

EP    1619472 A2    1/2006
JP    2008175578 A  7/2008
(Continued)

OTHER PUBLICATIONS

International Search Report & Written Opinion of the International Search Authority (KR) dated Dec. 10, 2012 for International Application No. PCT/US2012/040673, 7 pgs.
(Continued)

*Primary Examiner* — Helen Kwok
(74) *Attorney, Agent, or Firm* — Hunter Clark PLLC

(57) ABSTRACT

A torsional gyroscope is provided that includes: a pickup tine and a drive tine of piezoelectric material, pickup electrodes disposed along the pickup tine, drive electrodes disposed along the drive tine, and a drive mass. The drive tine has a first end attached to the pickup tine and is transverse to the drive tine. The drive mass is attached to a second end of the drive tine opposite the first end of the drive tine. An electric field applied to the drive electrodes induces a rotational oscillation of the drive tine causing the drive tine to rotate about the first axis, inducing the drive mass to rotate about the first axis. Angular rotation of the drive mass along a third axis induces a torque in the pickup tine that induces an electric field in the pickup tine that induces an electrical charge to build up in the pickup electrodes.

30 Claims, 12 Drawing Sheets

(51) Int. Cl.
 *G01C 19/5719* (2012.01)
 *G01C 19/5755* (2012.01)
 *G01C 19/56* (2012.01)

(52) U.S. Cl.
 CPC ..... *G01C 19/5719* (2013.01); *G01C 19/5755* (2013.01); *Y10T 74/1275* (2015.01)

(58) Field of Classification Search
 USPC .... 73/504.12, 504.14, 504.15, 510, 511, 493
 See application file for complete search history.

(56) References Cited

U.S. PATENT DOCUMENTS

| | | | | |
|---|---|---|---|---|
| 7,814,792 | B2* | 10/2010 | Tateyama | G01C 19/5607 73/504.12 |
| 7,814,793 | B2* | 10/2010 | Sato | G01C 19/56 702/104 |
| 8,794,065 | B1* | 8/2014 | Yang | G01P 1/023 73/493 |
| 9,246,018 | B2* | 1/2016 | Acar | G01C 19/5755 |
| 2008/0066547 | A1* | 3/2008 | Tanaka | G01C 19/5607 73/504.16 |
| 2008/0178673 | A1 | 7/2008 | Tateyama et al. | |
| 2008/0210007 | A1* | 9/2008 | Yamaji | G01C 19/5712 73/504.16 |
| 2010/0071467 | A1* | 3/2010 | Nasiri | G01C 19/5719 73/504.12 |
| 2011/0226057 | A1 | 9/2011 | Nishizawa | |

FOREIGN PATENT DOCUMENTS

| | | |
|---|---|---|
| JP | 2008185343 A | 8/2008 |
| WO | 2012037540 A2 | 3/2012 |

OTHER PUBLICATIONS

International Preliminary Report on Patentability for International Application No. PCT/US2012/040673, dated Dec. 9, 2014, 5 pgs.
Japan Patent Office (JPO) Office Action for Application No. 2015-515987 dated Jan. 5, 2016 (Official Translation & Original), 6 pgs.
Extended European Search Report (European Search Report & European Search Opinion) dated Apr. 20, 2016 for European Application No. EP12878367.7, 11 pgs.

* cited by examiner

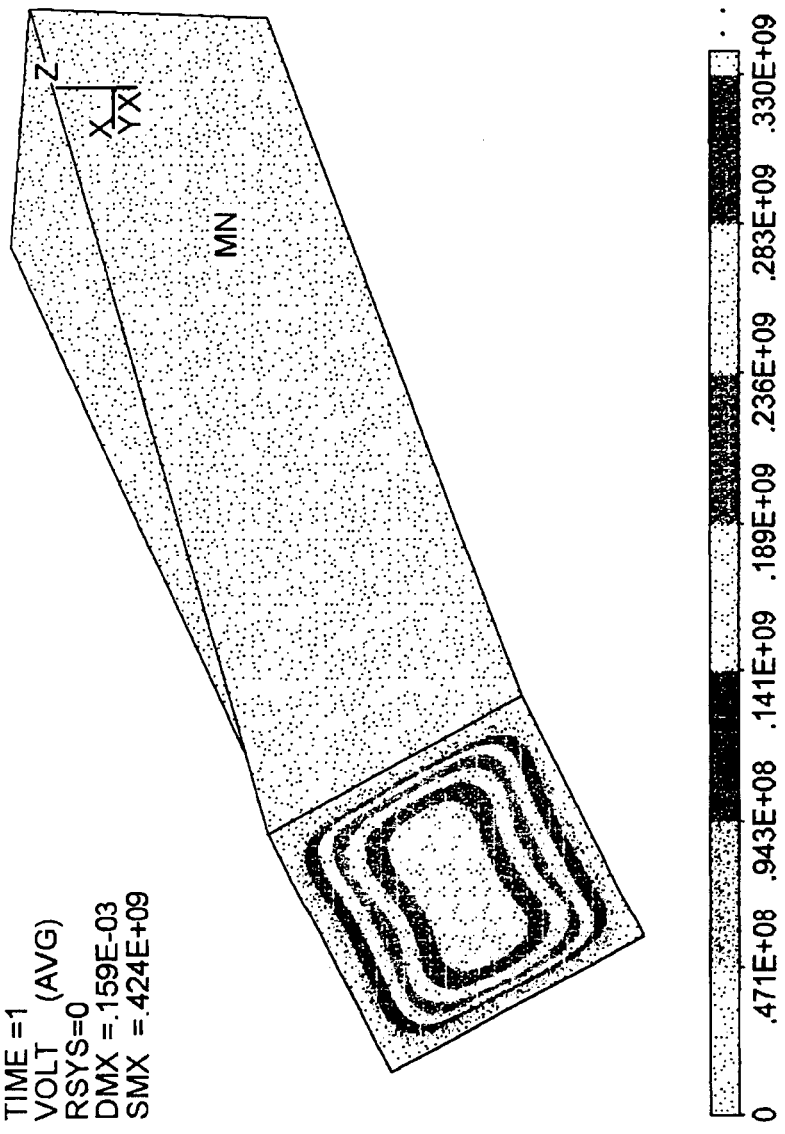

Z-Axis Gyroscope Drive Motion
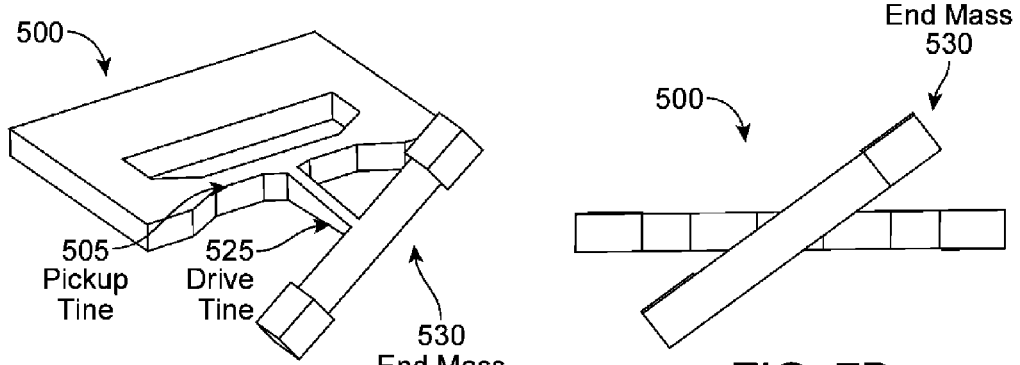
FIG. 7A
FIG. 7B
Torsional Gyroscope Pickup Motion
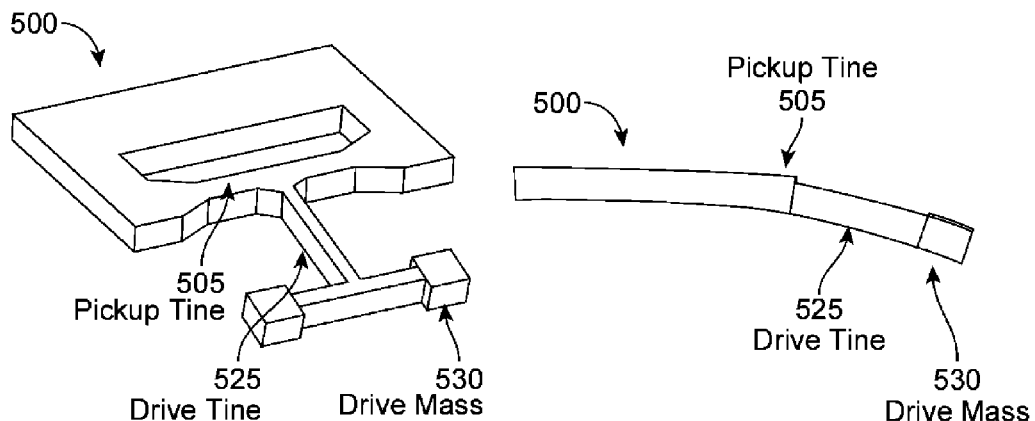
FIG. 7C
FIG. 7D

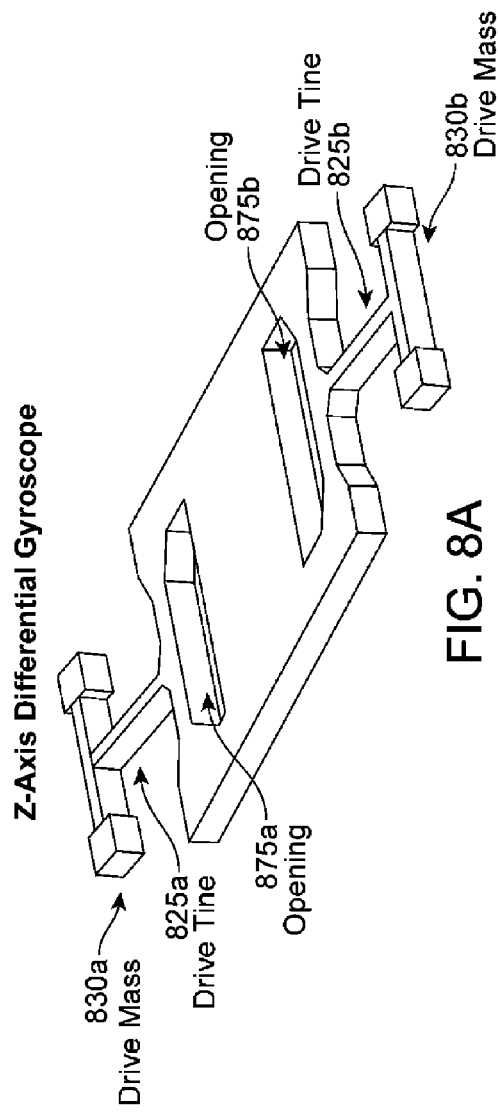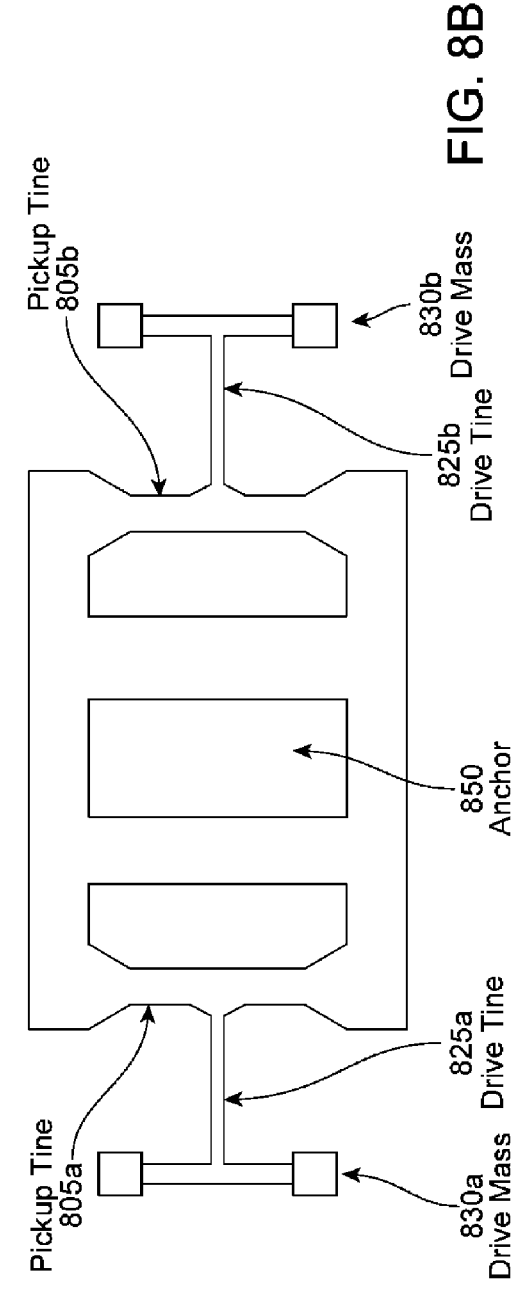

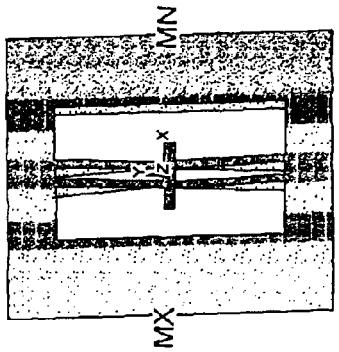
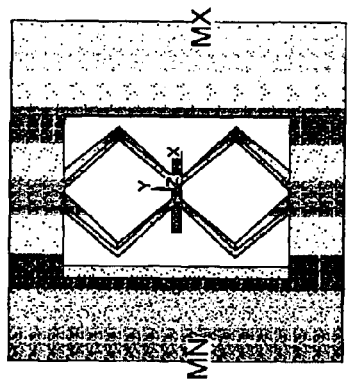
FIG. 13
FIG. 14

TORSIONAL RATE MEASURING GYROSCOPE

BACKGROUND

Micro-scale gyroscopes are commonly used in sensors to detect orientation and/or movement. For example, microelectromechanical systems (MEMS) gyroscopes can provide cost effective solutions for producing small-scale gyroscopic sensors. Micro-scale gyroscopes are used in inertial measurement units (IMUs). IMUs are electronic devices that can be used to detect velocity, orientation, and gravitational forces. IMUs can include both gyroscopes and accelerometers. An IMU typically includes three gyroscopes, each configured to measure one access of input rotation. For example, one gyroscope in the IMU could detect pitch of an aircraft, a second gyroscope in the IMU could detect roll, and a third gyroscope could detect yaw of the aircraft. IMUs are used in a number of applications, including automobiles, still frame and video camera systems, video game controllers, tablet computers or other handheld computer systems, and mobile phone handsets.

Tuning fork gyroscopes are one variety of gyroscope that are often used to in IMUs to measure about one axis of input rotation per tuning fork. Measurement about two axes can be achieved by mounting two tuning fork gyroscope sensors perpendicular to one another on the same plane. However, to realize measurements about the third axis, a third tuning fork gyroscope would need to be mounted out-of-plane from the other two tuning fork gyroscope sensors. This configuration can result in a larger form factor for the IMU, which can preclude the use of the IMU in some space constrained applications. For example, the form factor of tablet computers or mobile phone handsets may not have sufficient space available to accommodate the form factor of the IMU.

SUMMARY

An example of a torsional gyroscope according to the disclosure includes a pickup tine, a plurality of pickup electrodes, a drive tine, a plurality of drive electrodes, and a drive mass. The drive tine has a length along a first axis, and the drive tine comprises a piezoelectric material. The pickup tine has a length along a second axis, and the pickup tine also comprises a piezoelectric material. The pickup tine is transverse to the drive tine, and the drive tine has a first end attached to the pickup tine. The plurality of pickup electrodes is disposed along the pickup tine, and the plurality of drive electrodes is disposed along the drive tine. The drive mass is attached to the second end of the drive tine opposite to the first end of the drive tine. The drive electrodes and the drive tine are configured such that an electric field applied to the drive electrodes will induce a rotational oscillation of the drive tine such that the drive tine will rotate about the second axis, inducing the drive mass to rotate about the first axis. Angular rotation of the oscillating drive mass about a third axis will induce a torque about a second axis (also referred to herein as the pickup axis) that will induce a torsional strain in the pickup tine that will induce an electric field in the pickup tine that will induce an electrical charge to build up in the plurality of pickup electrodes.

Implementation of such a torsional gyroscope may also, or alternatively, include one or more of the following features. The piezoelectric material comprising at least one of the drive tine and the pickup tine is quartz. The drive tine has a rectilinear cross-section, and wherein a drive electrode of the plurality of drive electrodes is disposed at each corner of the rectilinear cross-section. The drive tine and the drive electrodes are configured such that the electric field applied to the drive electrodes induces a mechanical shear in the piezoelectric material comprising the drive tine. The drive tine and the drive electrodes are configured such that the electric field applied to the drive electrodes induces the drive tine to rotate about a centroid of the cross-section of the drive tine. The rotation of the drive tine in turn drives a drive mass into oscillatory motion about the first axis. The pickup tine has a rectilinear cross-section, and wherein a pickup electrode of the plurality of pickup electrodes is disposed on each side of the rectilinear cross-section of the pickup tine. The pickup tine and the drive tine are configured such that angular rotation of the drive mass about the third axis will induce angular rotation of the pickup tine that will induce the electric displacement field in the pickup tine. The pickup tine is configured such that the charge induced on the plurality of pickup electrodes is proportional to the angular rotation rate about the third axis.

An example of a planar three-dimensional inertial sensor system according to the disclosure includes a first gyroscopic sensor, a second gyroscopic sensor, and a torsional gyroscopic sensor. The first gyroscopic sensor is configured to measure rotation about a first axis of rotation. The second gyroscopic sensor is configured to measure rotation about a second axis of rotation. The torsional gyroscopic sensor configured to measure rotation about a third axis of rotation. The first gyroscopic sensor, the second gyroscopic sensor, and the torsional gyroscopic sensor are disposed along a same plane.

Implementation of such a planar three-dimensional inertial sensor system may also, or alternatively, include one or more of the following features. At least one of the first gyroscopic sensor and the second gyroscopic sensor is a tuning fork gyroscopic sensor. The torsional gyroscopic sensor is configured to measure deflection of a drive mass induced into rotational oscillation about the first axis of rotation, the torsional gyroscopic sensor being configured to measure angular rotation about the third axis of rotation. The torsional gyroscopic sensor includes a pickup tine, a plurality of pickup electrodes, a drive tine, a plurality of drive electrodes, and a drive mass. The drive tine has a length along a first axis and comprises a piezoelectric material. The pickup tine has a length along a second axis and comprises a piezoelectric material. The pickup tine is transverse to the drive tine, and the drive tine has a first end attached to the pickup tine. The plurality of pickup electrodes is disposed along the pickup tine. The plurality of drive electrodes is disposed along the drive tine. The drive mass is attached to a second end of the drive tine opposite the first end of the drive tine. The drive electrodes and the drive tine are configured such that an electric field applied to the drive electrodes will induce a rotational oscillation of the drive tine such that the drive tine will rotate about the first axis, inducing the drive mass to rotate about the first axis. Angular rotation of the drive tine about a third axis will induce a torque in the pickup tine that will induce an electric field in the pickup tine that will induce an electrical charge to build up in the plurality of pickup electrodes.

An example of a torsional gyroscope according to the disclosure includes a pickup frame, an anchor point, a plurality of pickup beams, a plurality of pickup electrodes, a drive frame, a plurality of drive beams, and a plurality of drive electrodes. The pickup frame has a central opening, and the anchor point is disposed within the central opening of the pickup frame. The plurality of pickup beams connects the pickup frame to the anchor point, and the pickup beams comprise a piezoelectric material. The plurality of pickup electrodes is attached to the pickup beams. The drive frame has a central opening, and the pickup frame is disposed within the central opening of the drive frame. The plurality of drive beams connects the drive frame to the pickup frame, and the drive beams comprising a piezoelectric material. The plurality of drive electrodes is disposed on the drive beams. The drive beams and the drive electrodes are configured such that an applying an electric field to the drive electrodes induces a rotational oscillation of the drive beams about the first axis. The rotation of the drive beams induces the drive frame to rotate about the first axis. Angular rotation of the drive frame about a third axis will induce a torque on the pickup frame, which induces torsional strain on the pickup tines. This torsional strain in the pickup tines will induce an electric displacement field in the pickup tines that will induce an electric charge to build up in the plurality of pickup electrodes. The measured charge is proportional to the input angular rotation about the third axis.

Implementation of such a torsional gyroscope may also, or alternatively, include one or more of the following features. The piezoelectric material comprising at least one of the drive tine and the pickup tine is quartz. The drive beams have a rectilinear cross-section, and wherein a drive electrode of the plurality of drive electrodes is disposed at each corner of the rectilinear cross-section. The drive beams and the drive electrodes are configured such that the electric field applied to the drive electrodes induces a mechanical shear in the piezoelectric material comprising the drive beams. The drive beams and the drive electrodes are configured such that the electric field applied to the drive electrodes induces the drive beams to rotate about a centroid of the cross-section of each of the drive tines. The pickup beams have a rectilinear cross-section, and wherein a pickup electrode of the plurality of pickup electrodes is disposed on each side of the rectilinear cross-section of the pickup beams. The pickup beams and the drive frame are configured such that angular rotation of the drive frame about the third axis will induce angular rotation of the pickup tines that will induce the electric displacement field in the pickup beams. The pickup beams comprise a plurality of beams oriented such that the beams are oriented according to the crystalline structure of the piezoelectric material comprising the beams. The plurality of beams is oriented to cancel at least a portion of the anisotropic properties of the piezoelectric material comprising the beams. The plurality of beams comprising quartz and the beams are oriented along the X axis of the crystalline structure of the quartz. The cross-members are aligned with the crystalline structure of the quartz to reduce the torsion of the cross-members along the first axis of rotation.

An example of a differential torsional gyroscopic sensor according to the disclosure includes a first pickup tine, a second pickup tine, a plurality of first pickup electrodes, a plurality of second pickup electrodes, a first drive tine, an second drive tine, a first plurality of drive electrodes, a second plurality of drive electrodes, a first drive mass, and a second drive mass. The first drive tine has a length along a first axis and the first drive tine comprises a first piezoelectric material. The first pickup tine has a length along a second axis, and the first pickup tine comprises a second piezoelectric material. The first pickup tine is transverse to the first drive tine, and the first drive tine having a first end attached to the first pickup tine. The plurality of first pickup electrodes is disposed along the first pickup tine. The plurality of first drive electrodes is disposed along the drive tine. The first drive mass is attached to a second end of the first drive first tine opposite the first end of the first drive tine. The second drive tine has a length along the first axis, and the second drive tine comprising a third piezoelectric material. The second pickup tine has a length along the second axis, and the second pickup tine comprises a fourth piezoelectric material. The second pickup tine is transverse to the second drive tine, and the second drive tine has a first end attached to the second pickup tine. The plurality of second pickup electrodes is disposed along the second pickup tine. The plurality of second drive electrodes is disposed along the second drive tine. The second drive mass is attached to a second end of the second drive tine opposite the first end of the second drive tine. The first pickup tine and the second pickup tine share a common anchor point. The first drive electrodes and the first drive tine are configured such that an electric field applied to the first drive electrodes will induce a rotational oscillation of the first drive tine such that the first drive tine will rotate about the first axis, inducing the first drive mass to rotate about the first axis. Angular rotation of the first drive mass about a third axis will induce a torque in the first pickup tine that will induce an electric field in the first pickup tine that will induce an electrical charge to build up in the first pickup electrodes. The second drive electrodes and the second drive tine are configured such that an electric field applied to the second drive electrodes will induce a rotational oscillation of the second drive tine such that the second drive mass will rotate about the second axis, inducing the second drive mass to rotate about the first axis. Angular rotation of the second drive mass about a third axis will induce a torque in the second pickup tine that will induce an electric field in the second pickup tine that will induce an electrical charge to build up in the second pickup electrodes.

Implementation of such a differential torsional gyroscopic sensor may also, or alternatively, include one or more of the following features. The first, second, third, and fourth piezoelectric materials are the same piezoelectric material. The first drive tine has a rectilinear cross-section, and a drive electrode of the plurality of first drive electrodes is disposed at each corner of the rectilinear cross-section. The first drive tine and the first drive electrodes are configured such that the electric field applied to the first drive electrodes induces a mechanical shear in the piezoelectric material comprising the first drive tine. The first drive tine and the first drive electrodes are configured such that the electric field applied to the first drive electrodes induces the first drive tine to rotate about a centroid of the cross-section of the first drive tine. The first pickup tine has a rectilinear cross-section, and wherein a pickup electrode of the plurality of first pickup electrodes is disposed on each side of the rectilinear cross-section of the first pickup tine. The first pickup tine and the first drive tine are configured such that angular rotation of the first drive mass about the third axis will induce angular rotation of the first pickup tine that will induce the electric displacement field in the first pickup tine. The first drive tine and the second drive tine are configured such that applying an electrical field to the first drive electrodes and the second drive electrodes induces rotational oscillation of the first drive tine in a first direction and the second drive tine in a second direction opposite the first direction.

BRIEF DESCRIPTION OF THE DRAWINGS

FIG. 4A is a perspective view of a piezoelectric beam showing a potential and electric field generated by twisting of the beam.

FIG. 7A is a perspective view of the torsional gyroscopic sensor shown in FIGS. 5A-5C illustrating the drive motion of the torsional gyroscopic sensor.

FIG. 7B is a front view of the torsional gyroscopic sensor shown in FIGS. 5A-5C illustrating the drive motion of the torsional gyroscopic sensor.

FIG. 7C is a perspective view of the torsional gyroscopic sensor shown in FIGS. 5A-5C illustrating the pickup motion of the torsional gyroscopic sensor.

FIG. 7D is a side view of the torsional gyroscopic sensor shown in FIGS. 5A-5C illustrating the drive motion of the torsional gyroscopic sensor.

FIG. 8A is a perspective view and FIG. 8B is a top view of an example of a differential torsional gyroscopic sensor.

FIG. 13 is a modal analysis of a torsional gyroscopic sensor that uses a straight beam for the pickup beams that connect the pickup frame to the anchor.

FIG. 14 is a modal analysis of a torsional gyroscopic sensor that uses scissor hinges similar to those used in the FIG. 11 to connect the pickup frame to the anchor.

DETAILED DESCRIPTION

Torsional rate measuring gyroscopic sensors are disclosed herein. An example of a torsional gyroscopic sensor includes a piezoelectric drive mechanism to provide rotational oscillations about a drive axis and a piezoelectric pickup mechanism for detecting gyroscopic motion induced by rotation about an axis mutually orthogonal to the drive and the pickup axes. The piezoelectric mechanisms can be formed from quartz or other piezoelectric materials. The torsional gyroscopic sensor can be integrated into fully-planar three-dimensional inertial rate measurement systems (IMUs) that provide a smaller form factor than conventional IMUs.

Figure 1:
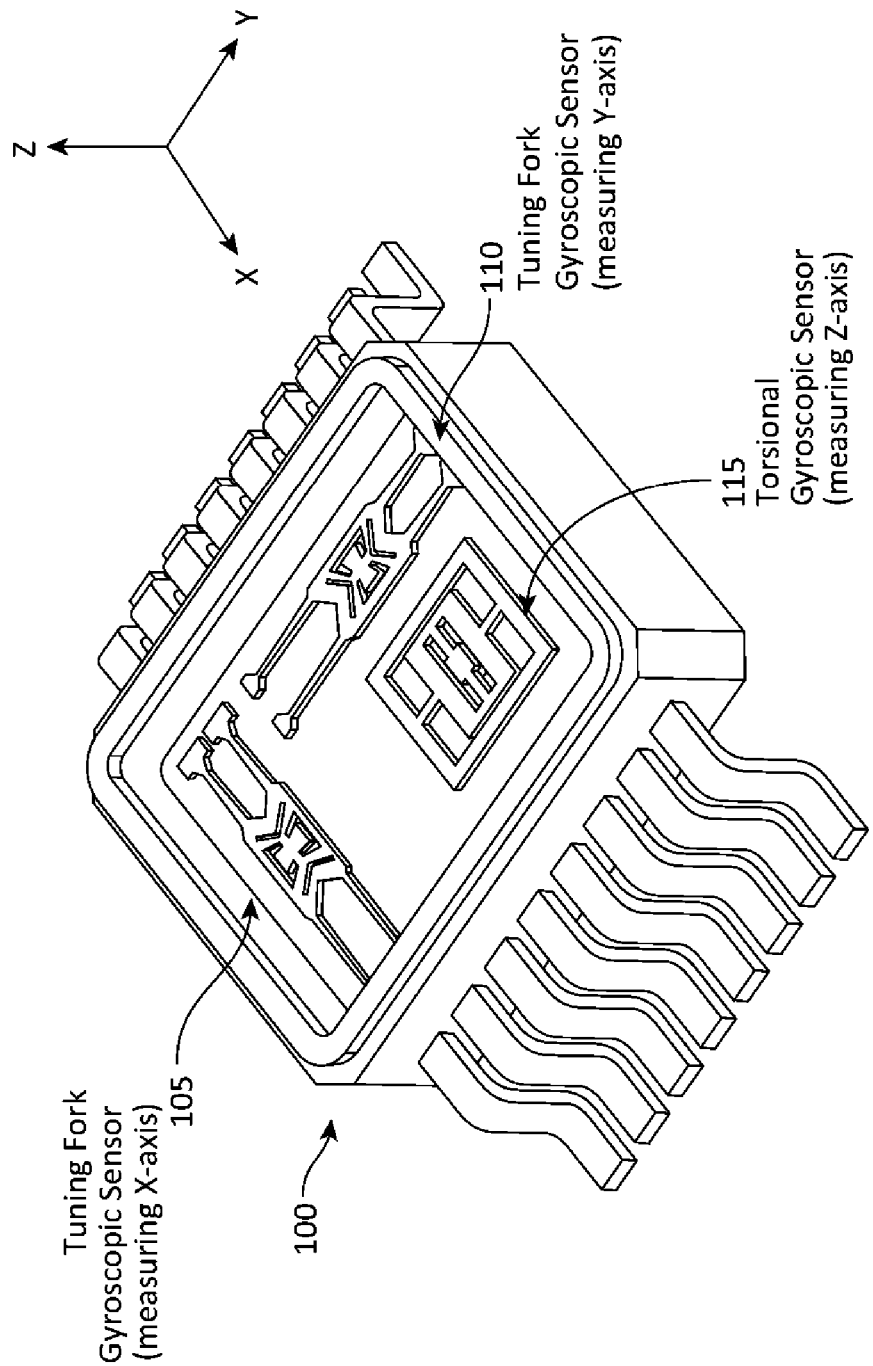
FIG. 1 is a perspective view of a planar three-dimensional measurement system that includes a torsional gyroscopic sensor.

FIG. 1 is a diagram illustrating a planar three-dimensional inertial sensor system 100 than can measure rotation about three axes of rotation. The inertial sensor system 100 can be used to implement an inertial measurement unit (IMU) or other sensor system for measuring movements about multiple axes of rotation. The inertial sensor system 100 includes three gyroscopic sensors 105, 110, and 115 that are configured to measure rotation about an axis of rotation, which allows the inertial sensor system 100 to measure rotational movement in three dimensions. The inertial sensor system 100 can also include one or more accelerometers (not shown) that can be used to detect a rate of acceleration of the three-dimensional inertial sensor system 100.

The inertial sensor system 100 can generate signals used to determine the orientation and/or the velocity in a number of applications. For example, the inertial sensor system 100 can be integrated into or affixed to a number of devices, such as a mobile phone or table computer system to measure pitch, roll, and yaw of the device and to provide output signals to the device that device can use to measure the orientation and movement of the device. The sensor system 100 can also be used in other types of devices, such as video game controllers, and can be used in navigation systems for the automobiles, aircraft, watercraft, and/or other types of vehicles.

The inertial sensor system 100 includes a tuning fork gyroscopic sensor 105, a tuning fork gyroscopic sensor 110, and a torsional gyroscopic sensor 115. Tuning fork sensor 105 is configured to measure rotation about the X-axis, the tuning fork gyroscopic sensor 110 is configured to measure rotation about the Y-axis, and the torsional gyroscopic sensor 115 is configured to measure rotation about the Z-axis in the example illustrated in FIG. 1. The tuning fork gyroscopic sensor 105 and the tuning fork gyroscopic sensor 110 can be implemented using quartz tuning fork gyroscopes. The tuning fork gyroscopic sensors 105 and 110 can operate in a drive mode and a pickup mode. In the drive mode, a set of test masses of the tuning fork gyroscopic sensors are driven to resonance. In the pickup mode, displacement of the test masses from the plane of oscillation is be measured to produce a signal, and this signal can be translated into a rate of rotation about the axis of rotation that the tuning fork gyroscopic sensor 105 or tuning fork gyroscopic sensor 110 is configured to measure.

The torsional gyroscopic sensor 115 uses gyroscopic moment coupling between a drive torsional mode and a pickup torsional mode to produce a signal output that is proportional to the input rotational rate about the Z-axis. In contrast with the tuning fork gyroscopic sensors 105 and 110, the torsional gyroscopic sensor 115 uses rotational oscillations in the drive and pickup modes. The torsional gyroscopic sensor 115 comprises piezoelectric material, such as quartz. In the drive mode, applying an electric field to the torsional gyroscopic sensor 115 induces rotational oscillations of the drive members about an axis of rotation. These drive members can drive a drive mass or drive frame into rotational oscillation. In the pickup mode, rotation about the Z-axis induces torsional forces in a piezoelectric pickup member of the torsional gyroscopic sensor 115. These torsional forces create torsional stresses in the piezoelectric material of the pickup member, which induces the piezoelectric material to generate an electric field. The electric field causes a charge to build up on pickup electrodes disposed along the pickup member. The torsional gyroscopic sensor 115 can output a signal that represents an input rate of rotation about the Z-axis. Various examples of the torsional gyroscopic sensors that can be used to implement torsional gyroscopic sensor 115 are described in detail below.

The torsional gyroscopic sensor 115 allows for all three gyroscopes in the inertial sensor system 100 to be disposed in a planar configuration. As a result, the inertial sensor system 100 can provide a smaller form factor that would be possible in a conventional three-dimensional inertial sensor system that includes three linear oscillator sensors. In conventional inertial sensor systems that include three linear oscillator sensors, one of the three linear oscillators would have had to have been mounted perpendicular to the plane on which the other two sensors are mounted in order for the sensors to be able to measure rotation about all three axes of rotation. The small form factor of the inertial sensor system 100 may be particularly useful in portable electronic devices, such as mobile phones, handheld computers, and tablet computers that may include applications that make use of the orientation of the device, in video game controllers to capture orientation and/or velocity information, and in other portable devices where a small form factor is desirable.

Figure 2:
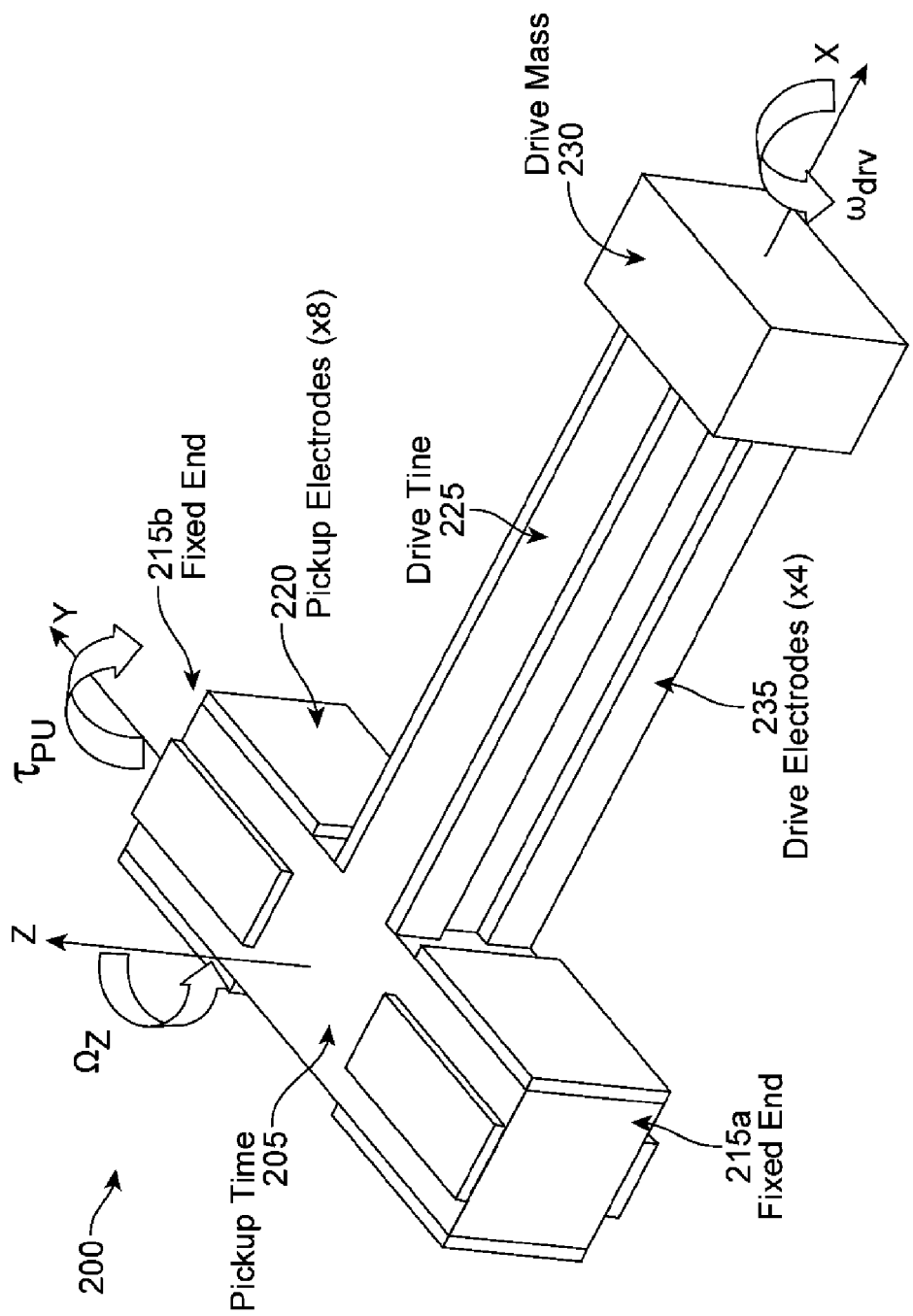
FIG. 2 is a perspective view of an example of a torsional gyroscopic sensor.

FIG. 2 is a diagram illustrating an example of a torsional gyroscopic sensor 200. The torsional gyroscopic sensor 200 illustrated in FIG. 2 can be used to implement the torsional gyroscopic sensor 115 included in the three-dimensional inertial sensor system 100 illustrated in FIG. 1. The torsional gyroscopic sensor 200 can determine the rate of rotation about an axis of rotation using gyroscopic moment. In the example illustrated in FIG. 2, the torsional gyroscopic sensor 200 is configured to measure the rate of rotation about the Z-axis.

The torsional gyroscopic sensor 200 includes a pickup tine 205 (also referred to herein as a pickup member) that is rigidly fixed at end points 215a and 215b, and a drive tine 225 that is coupled to and transverse to the pickup tine 205. In some implementations, the drive tine 225 is perpendicular to the pickup tine 205, but the drive tine 225 does not necessarily have to be perpendicular to the pickup tine 205. The drive tine 225 supports drive mass 230. The pickup tine 205 and the drive tine 225 comprise a piezoelectric material, such as quartz.

In the example illustrated in FIG. 2, the drive tine 225 is oriented along the X-axis and a set of drive electrodes 235 are attached to the drive tine 225. The drive tine 225 has a substantially rectilinear cross-section, and the drive electrodes 235 are placed at the corners of the rectilinear cross-section of the drive tine 225. The drive electrodes 235 can be used to apply an electric field through the drive tine 225 along the Y-axis, which induces an XY shear in the cross-section of the drive tine 225. The drive electrodes 235 are designed such that an applied field generates shear couple about the centroid of the cross section, causing rotation of the drive tine 225, which in turn rotates the drive mass 230. Thus, the drive mass 230 is driven into oscillation.

The torsional oscillation of the drive tine 225 and drive mass 230 of inertia generates a modulating angular momentum $H(t)=(w_{drv}(t)*J_t)$ about the X-axis. In the presence of an input angular rotation $\Omega_z$ about the Z-axis, the applied torques $\tau$ on the structure are found from the change in angular momentum:

$$\tau = \dot{H}(t) = (\dot{\omega}_{drv} \cdot J_t)\hat{x} + \Omega_z \times H(t)$$

$$\tau_{PU} = \Omega_z \times H(t) = (\Omega_z \cdot H(t))\hat{y}$$

where $\tau_{PU}$ is a torque applied about the pickup tine 205 oriented along the Y direction. Thus, the pickup response is a torsional vibration of the pickup tine 205 with the coupled drive tine 225 and drive mass 230 about the Y-axis. When the pickup tine 205 twists, the mechanically induced shear piezoelectrically couples in an electric potential field.

Figure 3A:
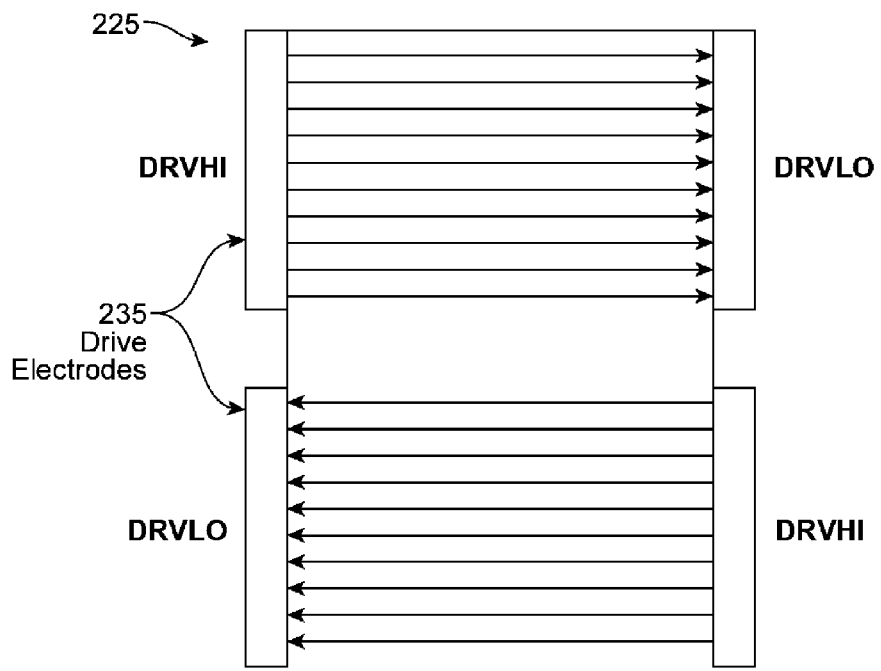
FIGS. 3A and 3B are cross-sectional views of the drive tine of the torsional gyroscopic sensor shown in FIG. 2 showing an applied electrical field.
Figure 3B:
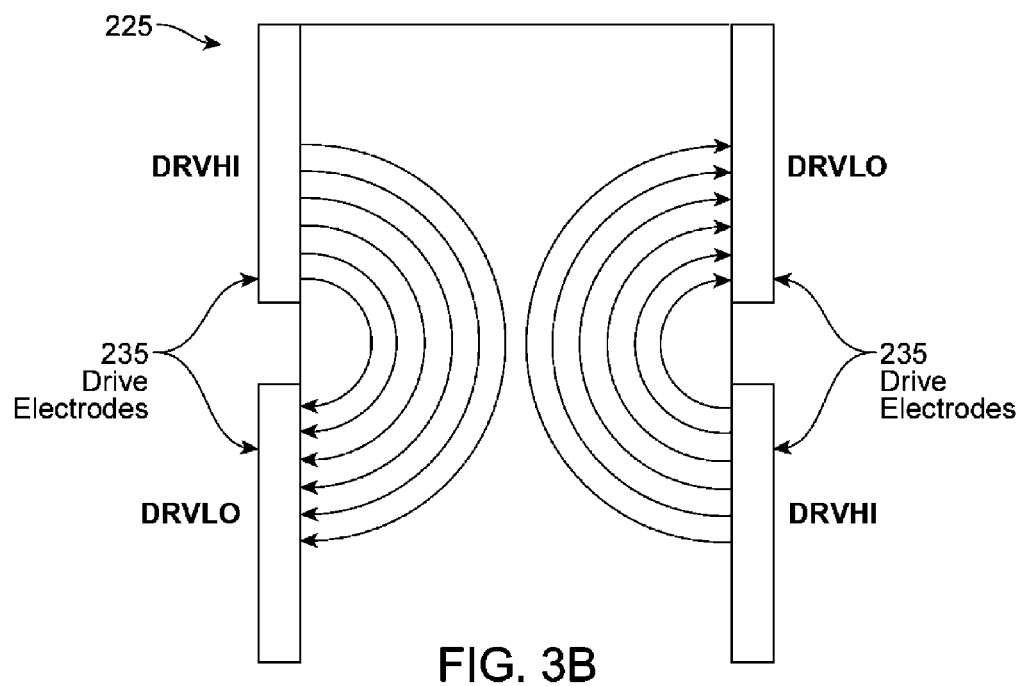

FIGS. 3A and 3B illustrate cross-sections of the drive tine 225 and illustrate how an applied electrical field generates shear couple about the centroid of the cross-section of the drive tine 225, causing rotation of the drive tine 225. The total electric field is the superposition of (a) the parallel plate electrodes (FIG. 3A) and (b) fringing between coplanar electrodes (FIG. 3B). Field lines along the Y-direction (left and right in FIG. 3A) generate a XY shear of opposite polarity to the field vector. With the electrodes in this configuration, a shear couple is created which torques the drive beam 225 about the axis of rotation of the drive beam.

Figure 4B:
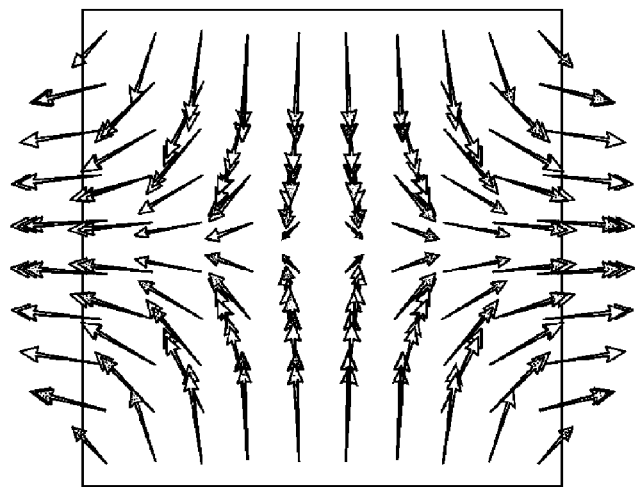
FIG. 4B is a cross-sectional view of a piezoelectric beam showing a potential and electric field generated by twisting of the beam.

When the pickup tine 205 twists in response to the pickup tine and/or the drive mass being displaced along the Z-axis, the mechanically induced shear piezoelectrically couples in an electric potential field, which generates an electric displacement field. The electric displacement induces charge build up in the pickup electrodes proportional to the drive oscillation and the input angular rate. FIG. 4A illustrates the potential field generated in a piezoelectric beam, such as pickup time 225, along the Y-axis where all four sides of the piezoelectric beam are grounded. FIG. 4B illustrates an electric displacement (D) field induced in a cross-section of the piezoelectric beam illustrated in FIG. 4A. The top and bottom of the beam illustrated in FIG. 4B have like charges and the sides of the beam have like charges that are opposite the charge of the top and bottom of the beam.

Figures 5A, 5B, 5C:
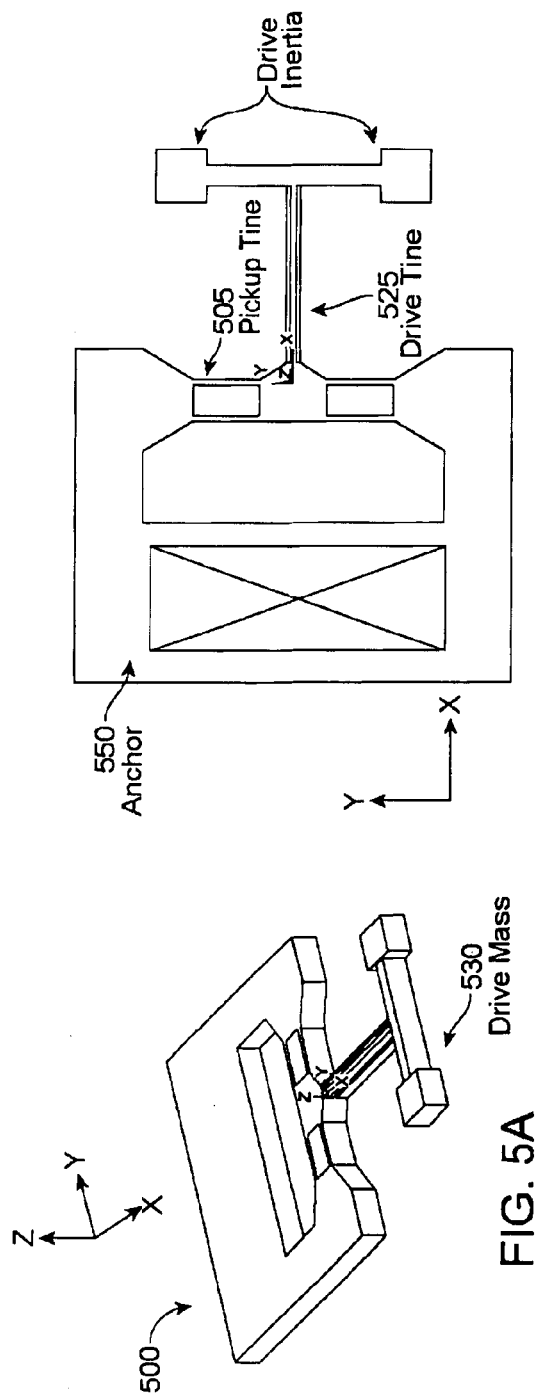
FIG. 5A is a perspective view of a torsional gyroscopic sensor.
FIG. 5B is close up perspective view of a portion of the torsional gyroscopic sensor shown in FIG. 5A.
FIG. 5C is a top view of the torsional gyroscopic sensor show in FIGS. 5A and 5B.

FIGS. 5A, 5B, and 5B illustrate an example of a torsional gyroscopic sensor 500. The torsional gyroscopic sensor 500 illustrated in FIGS. 5A, 5B, and 5C can be used to implement the torsional gyroscopic sensor 115 included in the three-dimensional inertial sensor system 100 illustrated in FIG. 1. The planar configuration of the torsional gyroscopic sensor 500 allows the sensor to be installed in a planar configuration with sensors to measure rotation about the X and Y axes.

FIG. 5A provides a perspective view of the torsional gyroscopic sensor 500, FIG. 5B is a top view of the torsional gyroscopic sensor 500, and FIG. 5C provides a close up perspective view of a portion of the torsional gyroscopic sensor 500. The pickup electrodes 520 are positioned on the pickup tine 505 (also referred to herein as a pickup member), and the drive electrodes 535 are positioned on the drive tine 525 (also referred to herein as a drive member). The drive tine 525 is coupled to and transverse to the pickup tine 505, and the drive tine 525 and the pickup tine 505 are oriented on the same plane. In some implementations, the drive tine 525 is perpendicular to the pickup tine 505, but the drive tine 525 does not necessarily have to be perpendicular to the pickup tine 505. The drive tine 525 supports drive mass 530.

The drive tine 525 has a similar principle of operation as the drive tine 225 of the torsional gyroscopic sensor 200 illustrated in FIG. 2. The drive tine 525 is oriented along the X-axis, where an electric field component along the Y-axis induces an XY shear in the cross section of the drive tine 525. The drive electrodes 535 are designed such that an applied field generates shear couple about the centroid of the cross section, causing rotation of the drive tine 525.

The torsional oscillation of the drive tine 525 and drive mass 530 of inertia generates a modulating angular momentum $H(t)=(w_{drv}(t)*J_t)$ about the X-axis. In the presence of an input angular rotation $\Omega_z$ about the Z-axis, the applied torques t on the structure are found from the change in angular momentum:

$$\tau = \dot{H}(t) = (\dot{\omega}_{drv} \cdot J_t)\hat{x} + \Omega_z \times H(t)$$

$$\tau_{PU} = \Omega_z \times H(t) = (\Omega_z \cdot H(t))\hat{y}$$

where $\tau_{PU}$ is a torque applied about the pickup tine 505 oriented along the Y direction. Thus, the pickup response is a torsional vibration of the pickup tine 505 with the coupled drive tine 525 and drive mass 530 about the Y-axis.

Figure 6A:
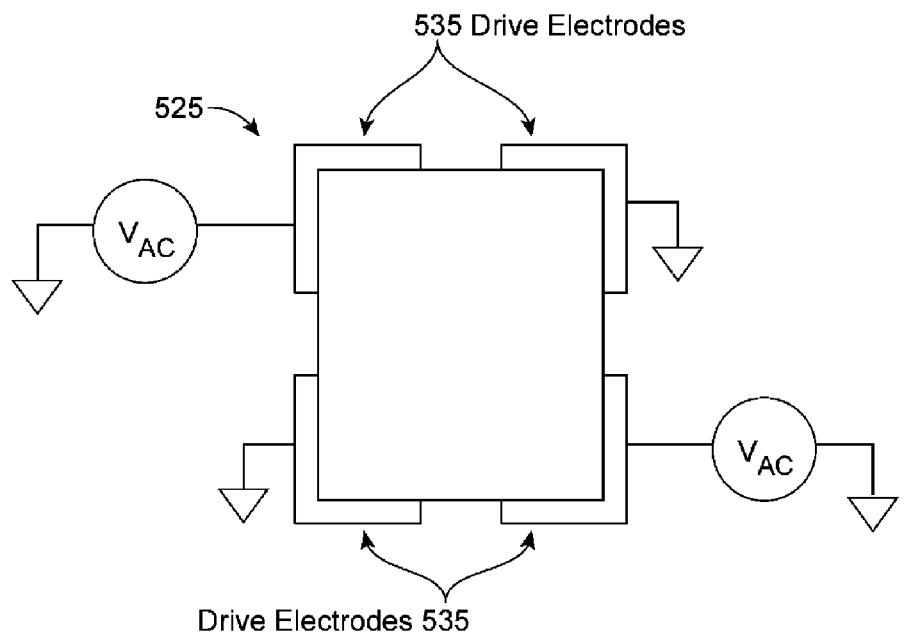
FIG. 6A is a cross-sectional view of the drive tine of the torsional gyroscopic sensor shown in FIGS. 5A-5C that illustrates a configuration of the drive electrodes on the drive tine.
Figure 6B:
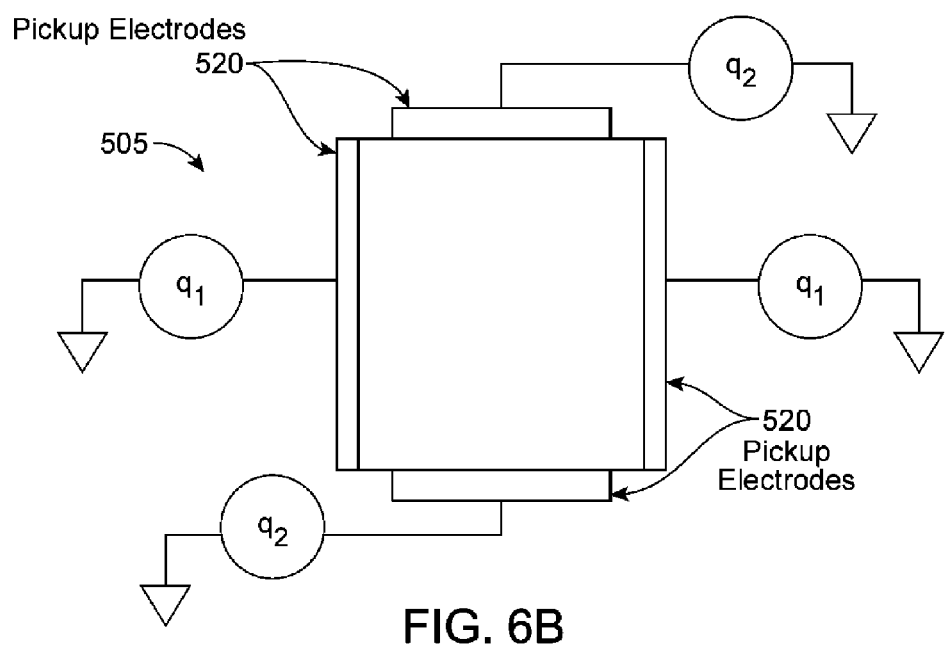
FIG. 6B is a cross-sectional view of the pickup tine of a torsional gyroscopic sensor shown in FIGS. 5A-5C that illustrates a configuration of the drive electrodes on the pickup tine.

FIG. 6A illustrates a cross-section of the drive tine 525 that illustrates a configuration of the drive electrodes 535 on the drive tine 525. FIG. 6B illustrates a cross-section of the pickup tine 505 that illustrates a configuration of the pickup electrodes 520 on the pickup tine 505.

FIGS. 7A and 7B illustrate the drive motion of the torsional gyroscopic sensor 500. FIG. 7A provides a perspective view of the torsional gyroscopic sensor 500 where the drive tine 525 has rotated about the X-axis. FIG. 7B provides a view of the torsional gyroscopic sensor 500 along the X-axis that illustrates the rotation of the drive mass 530 as the drive tine 525 rotates about the X-axis. The application of an electrical field to the drive electrodes 535 induces the rotational oscillation of the drive tine 525 about the centroid of the cross section of the axis. The rotation of the drive tine 525 drives the drive mass 530 into rotational oscillation.

FIGS. 7C and 7D illustrate the pickup motion of the torsional gyroscopic sensor 500. FIG. 7C provides a perspective view of the torsional gyroscopic sensor 500 where angular rotation of the drive mass 530 and the drive tine 525 about the Z-axis in response to displacement about the Z-axis. This angular rotation causes the pickup tine 505 to twist, inducing an electrical field in the piezoelectric material comprising the pickup tine 505.

FIG. 7D provides a side view of the torsional gyroscopic sensor 500 that illustrates the torsional rotation of the pickup tine 505 caused by the angular rotation of the drive mass 530 and the drive tine about the Z-axis in response to rotation about the Z-axis. The angular rotation of the drive tine 525 and the drive mass 530 about the Z-axis induces twisting of the pickup tine 505, which in turn induces an electrical field in the piezoelectric material of the pickup tine 505. When the pickup tine 505 twists, the mechanically induced shear piezoelectrically couples in an electric potential field, which generates an electric displacement field. The electric displacement field induces charge buildup in the pickup electrodes 520 that is proportional to the drive oscillation and input angular rate of the torsional vibration of the pickup tine 505 about the Y-axis. The charge buildup on the pickup electrodes 520 can be measured to determine the torsional rate about the Y-axis and to determine rate of motion along the Z-axis. The sensor can output a signal that is proportional to the rate of input rotational rate about the Z-axis. The signal out can be proportional to the input angular rotation about the Z-axis axis.

FIGS. 8A and 8B illustrate an example of a differential torsional gyroscopic sensor 800. The differential torsional gyroscopic sensor 800 illustrated in FIGS. 8A and 8B can be used to implement the torsional gyroscopic sensor 115 included in the three-dimensional inertial sensor system 100 illustrated in FIG. 1. The differential torsional gyroscopic sensor 800 includes two pickup tines 805a and 805b, two drive tines 825a and 825b, and two drive masses 830a and 830b. The body of the differential torsional gyroscopic sensor 800 also includes a common anchor point 850 that anchors the differential torsional gyroscopic sensor 800. The anchor 850 can be used to mount the differential torsional gyroscopic sensor 800 in a device. For example, the anchor 850 can be used to mount the torsional gyroscopic sensor 800 on a substrate. For example, the anchor 850 can be used to mount the torsional gyroscopic sensor 800 on a substrate of the planar three-dimensional inertial sensor system 100. The body of the differential torsional gyroscopic sensor 800 includes an opening 875a that is defined on one side by the pickup tine 805a an opening 875b that is defined on one side by the pickup tine 805b.

The torsional gyroscopic sensor 800 can operate in a differential mode that can provide improved common mode rejection. An electrical current can be applied to the drive electrodes (not shown) of the drive tines 825a and 825b to causes the piezoelectric material of the drive tines 825a and 825b to deform causing the drive tines 825a and 825b to rotate about the X-axis. The pickup tines 805a and 805b include pickup electrodes (not shown) disposed along the pickup tines 805a and 805b that operate similar to the pickup electrodes pickup electrodes 520 illustrated in the torsional gyroscopic sensor 500.

Motion about the Z-axis causes the pickup tines 805a and 805b to rotate about the Y-axis. The mechanically induced shear on the piezoelectric structure of the pickup tines 805a and 805b induces a charge buildup on the pickup electrodes disposed on the pickup tines 805a and 805b. The charge buildup on the pickup electrodes 520 can be measured to determine the torsional rate about the Y-axis and to determine rate of motion about the Z-axis. Furthermore, signals received from the electrodes on each of the pickup tines 805a and 805b can be separately monitored and compared to produce a cleaner signal. The differential configuration allows for rejection of common mode deflections, such as from linear accelerations, which could otherwise give an erroneous output with a single ended configuration. Additionally, the two drive masses can be operated in anti-phase where the momentum from the two masses cancels at the anchor mounting point 850, reducing vibrational damping losses.

Figure 9:
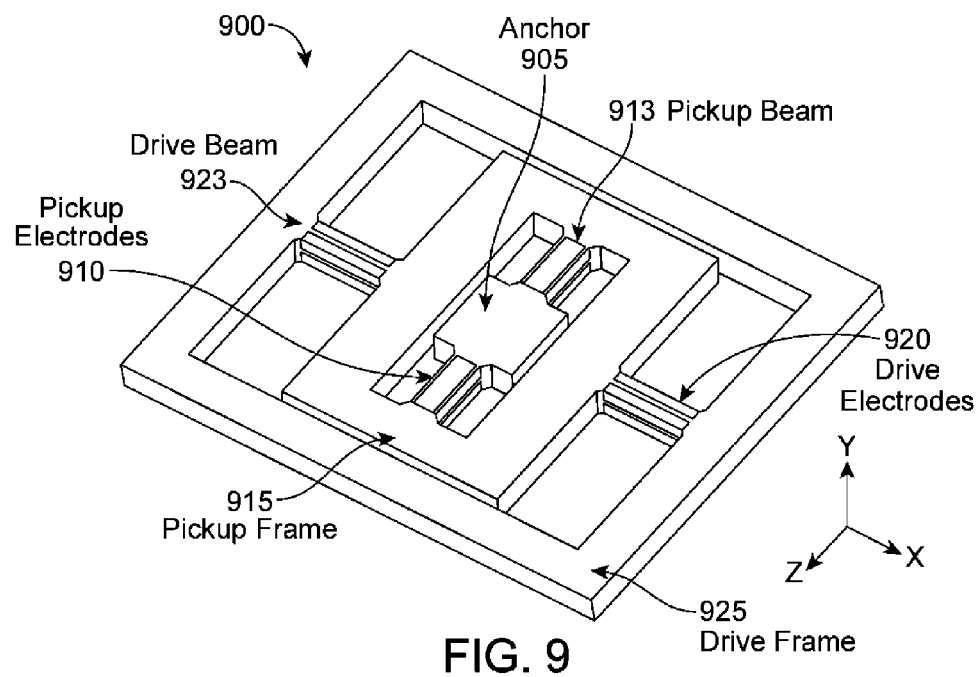
FIG. 9 is a perspective view of an example torsional gyroscopic sensor.
Figure 10:
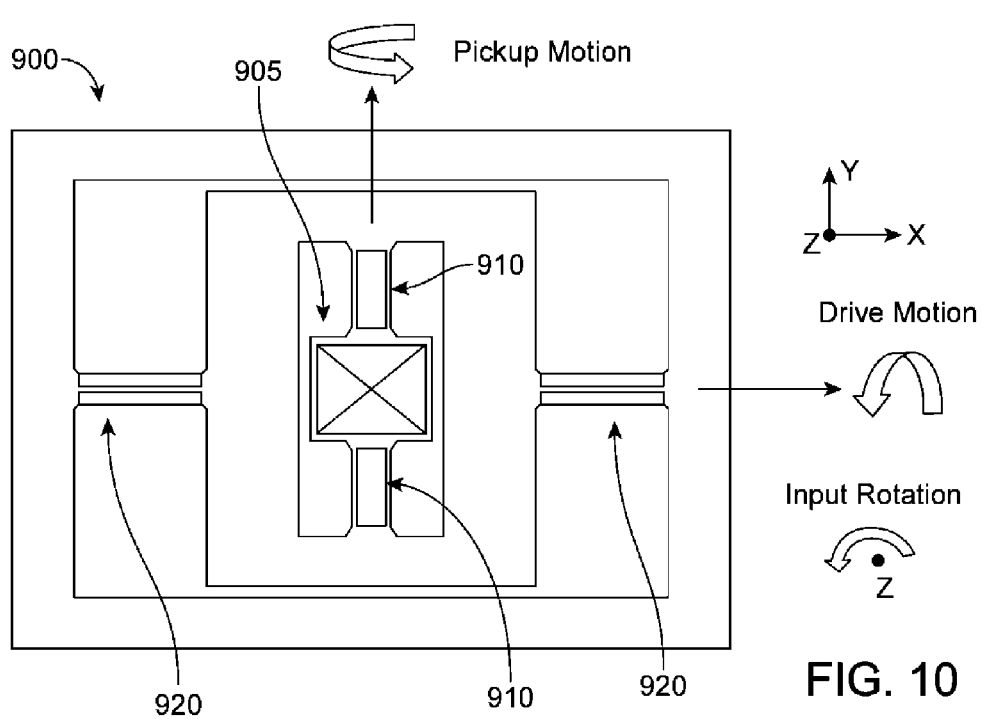
FIG. 10 is a top view of the torsional gyroscopic sensor illustrated in FIG. 9.

FIG. 9 is a diagram illustrating an example of a torsional gyroscopic sensor 900. The torsional gyroscopic sensor 900 illustrated in FIG. 5 can be used to implement the torsional gyroscopic sensor 115 included in the three-dimensional inertial sensor system 100 illustrated in FIG. 1. FIG. 10 provides a top view of the torsional gyroscopic sensor 900 illustrated in FIG. 9.

In the example torsional gyroscopic sensor 900 illustrated in FIG. 9, a drive frame 925 (also referred to as a drive mass) is driven into torsional oscillation using piezoelectric forces with a rotational axis designated the drive axis, which is the X-axis in FIG. 9. The torsional gyroscopic sensor 900 illustrated in FIG. 9 uses shear force piezoelectric coefficients induced by a specifically defined electric field generated by applying voltages on the drive electrodes 920.

The torsional gyroscopic sensor 900 includes an anchor 905 that can be used to mount the torsional gyroscopic sensor 900 on a substrate and to hold the torsional gyroscopic sensor 900 in place. The torsional gyroscopic sensor 900 includes a pickup frame 915 and a drive frame 925. The pickup frame 915 has a central opening and the anchor 905 is disposed within the central opening of the pickup frame 915. The pickup frame 915 is connected to the anchor 905 by a set of pickup beams 913. The pickup beams 913 are a piezoelectric material, such as quartz. The pickup frame 915 and/or the anchor 905 can comprise the same piezoelectric material as the pickup beams 913 or a different material than the pickup beams 913. The pickup electrodes 910 are attached to the pickup beams 913. Torsion of the pickup beams 913 induces a piezoelectric effect in the beams which induces a charge to build up in the pickup electrodes 910.

The torsional gyroscopic sensor 900 also includes a drive frame 925. The drive frame 925 has a central opening and the pickup frame 915 is disposed within the central opening of the drive frame 925. The drive frame 925 is connected to the pickup frame 915 by drive beams 923. The drive beams 923 are transverse to the pickup beams 913. In some implementations, the drive beams 923 are perpendicular to the pickup beams 913, but the drive beams 923 do not necessarily have to be perpendicular to the pickup beams 913.

The drive beams 923 are a piezoelectric material, such as quartz. The drive electrodes 920 are attached to the drive beams 923. Applying an electric field to the drive electrodes 920 induces a shear force in the drive beams 923 that causes to drive beams 923 to rotationally oscillate about the X-axis of the torsional gyroscopic sensor 900.

An input rotation about an axis perpendicular to the structure causes a gyroscopic torque about an axis mutually orthogonal to the drive axis (the X-axis in this example) and the input axis (the Y-axis in this example). This torque couples motion from the drive mode to a secondary pickup mode. The secondary pickup mode is a rotation of the pickup frame about the pickup axis (Y-axis in FIG. 9). The motion induces strain in the pickup beams 913 connecting the anchor to the pickup frame 915, which is in turn, sensed piezoelectrically using pickup electrodes 910.

The beam members 913 connecting the anchor 905 to the pickup frame 915 on which the pickup electrodes 910 are disposed can be oriented along the Y-axis of the quartz crystal comprising the beam members 913. Beams that are oriented along the quartz crystal Y-axis have internal stiffness coupling, which means that when the beams twist about the Y-axis in response to Y torque, the beams may also twist about the Z-axis. Similarly torques about the Z-axis can cause twisting about the Y-axis. As a result, an undesirable cross-coupling error may be introduced in some situations.

Figure 11:
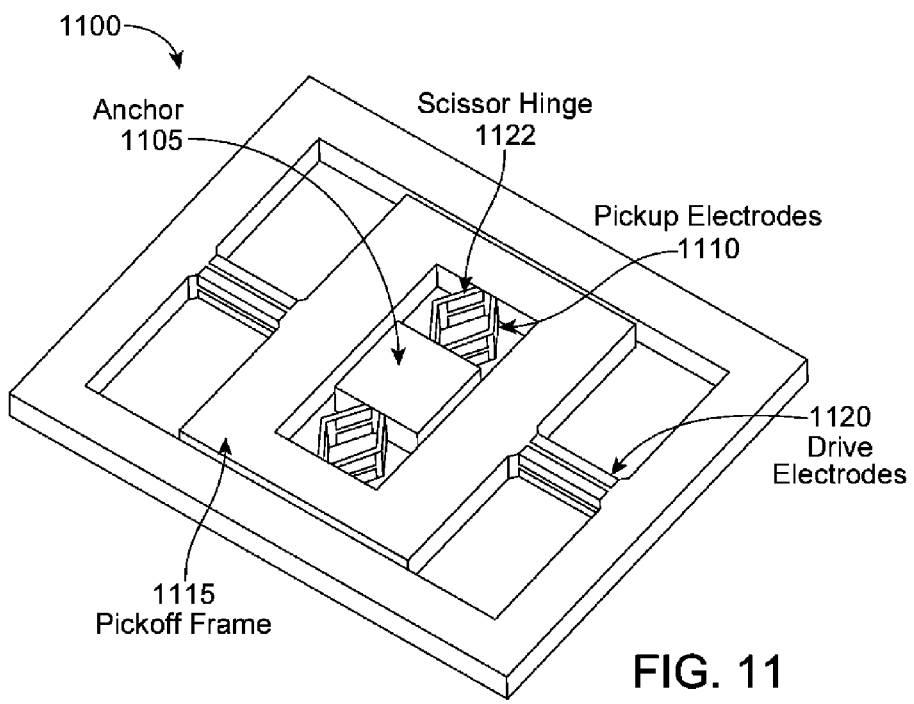
FIG. 11 is a perspective view of an example torsional gyroscopic sensor that includes scissor hinges connecting the pickup frame to the anchor.
Figure 12:
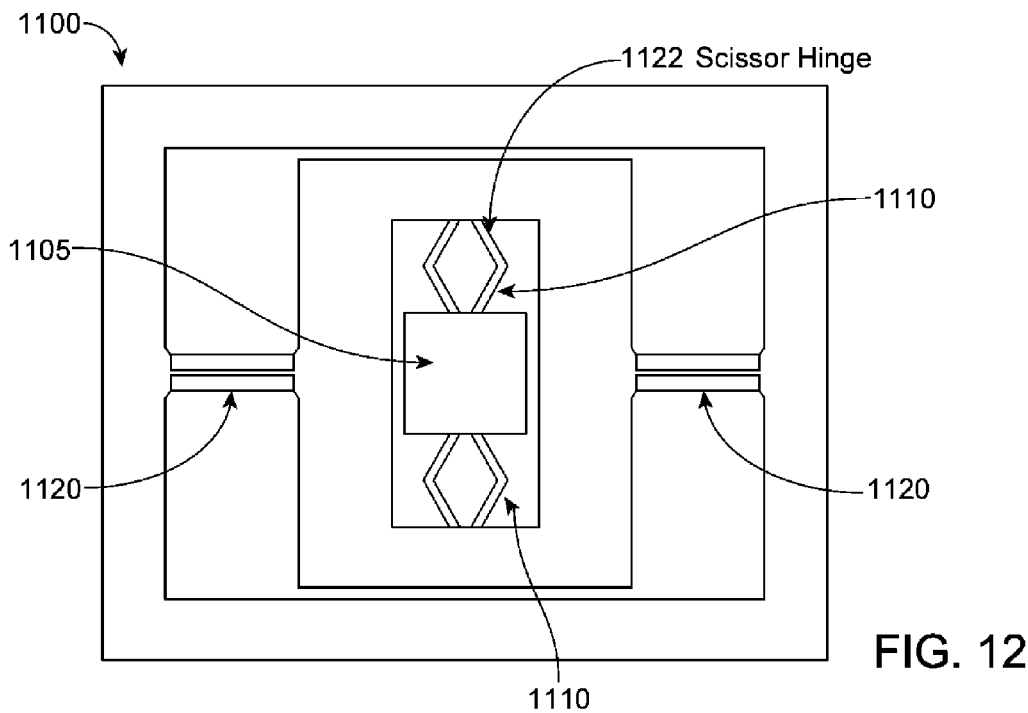
FIG. 12 is a top view of the torsional gyroscopic sensor illustrated in FIG. 11.

FIG. 11 provides a perspective view of an example torsional gyroscopic sensor 1100 that includes scissor hinges 1122 connecting the pickup frame 1115 to the anchor 1105 instead of the beams as in the torsional gyroscopic sensor 900 illustrated in FIG. 9. FIG. 12 provides a top view of the torsional gyroscopic sensor 1100 illustrated in FIG. 11. The scissor hinges 1122 include beams that are oriented along the quartz crystal X-axis. Quartz has a trigonal crystalline structure that has three different X-axes oriented every 120°. A beam along these axes is devoid of the coupling factor present in the straight beams. The X crystal oriented beams of scissor hinges 1122 lack the structural coupling inherent in Y crystal oriented beams. This configuration can cancel some of the anisotropic properties of the quartz comprising the pickup beams, eliminating or significantly reducing the deflections along the Z-axis resulting from torques about the Y-axis.

The torsional gyroscopic sensor 1100 includes an anchor 1105 that can be used to mount the torsional gyroscopic sensor 1100 on a substrate to hold the torsional gyroscopic sensor 1100 in place. The pickup frame 1115 has a central opening and the anchor 1105 is disposed within the central opening of the pickup frame 1115. The pickup frame 1115 is connected to the anchor 1105 by the scissor hinges 1122. The pickup electrodes 1110 are attached to the scissor hinges 1122. Torsion of the scissor hinges 1122 induces a piezoelectric effect in the beams of the scissor hinges 1122 which induces a charge to build up in the pickup electrodes 1110.

The charge buildup on the pickup electrodes 1110 can be measured to determine the torsional rate about the Y-axis and to determine rate of motion along the Z-axis. The sensor can output a signal that is proportional to the rate of input rotational rate about the Z-axis.

FIG. 13 is a diagram illustrating a modal analysis of a torsional gyroscopic sensor where that uses a straight beam for the pickup beams that connect the pickup frame to the anchor. FIG. 14 is diagram illustrating a modal analysis of a torsional gyroscopic sensor that uses scissor hinges similar to those used in the FIG. 11 to connect the pickup frame to the anchor. The shading in FIGS. 13 and 14 represents Z-linear deflection. It can be observed from these examples that beside Y-axis torsional motion, the straight beams illustrated in FIG. 13 also twist about the Z-axis. In contrast, the scissor hinges used in the torsional gyroscopic sensor of FIG. 14 only exhibit Y-axis torsional motion.

Various changes and modifications could be made to the descriptions provided above without departing from the scope of the disclosure or the appended claims. For example, although elements may be described or claimed in the singular, the plural may be included. Additionally, all or portions of aspects and/or embodiments may be utilized with other aspects and/or embodiments.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Other examples and implementations are within the scope and spirit of the disclosure and appended claims. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

Further, more than one invention may be disclosed.

What is claimed is:

1. A torsional gyroscope comprising:
    a drive tine having a length along a first axis, the drive tine comprising a piezoelectric material;
    a pickup tine having a length along a second axis, the pickup tine comprising a piezoelectric material, the pickup tine being transverse to the drive tine, the drive tine having a first end attached to the pickup tine; a plurality of pickup electrodes disposed along the pickup tine;
    a plurality of drive electrodes disposed along the drive tine; and
    a drive mass attached to a second end of the drive tine opposite the first end of the drive tine;
    wherein the plurality of drive electrodes and the drive tine are configured such that an electric field applied to the plurality of drive electrodes induces a rotational oscillation of the drive tine such that the drive tine rotates about the first axis, inducing the drive mass to rotate about the first axis; and
    wherein an angular rotation of the drive mass about a third axis induces a torque in the pickup tine that induces an electric field in the pickup tine that induces an electrical charge to build up in the plurality of pickup electrodes.

2. The torsional gyroscope of claim 1 wherein the piezoelectric material comprises at least one of the drive tine and the pickup tine is quartz.

3. The torsional gyroscope of claim 1 wherein the drive tine has a rectilinear cross-section, and wherein a drive electrode of the plurality of drive electrodes is disposed at each corner of the rectilinear cross-section.

4. The torsional gyroscope of claim 3 wherein the drive tine and the plurality of drive electrodes are configured such that the electric field applied to the plurality of drive electrodes induces a mechanical shear in the piezoelectric material comprising the drive tine.

5. The torsional gyroscope of claim 4 wherein the drive tine and the plurality of drive electrodes are configured such that the electric field applied to the plurality of drive electrodes induces the drive tine to rotate about a centroid of the rectilinear cross-section of the drive tine.

6. The torsional gyroscope of claim 1 wherein the pickup tine has a rectilinear cross-section, and wherein a pickup electrode of the plurality of pickup electrodes is disposed on each side of the rectilinear cross-section of the pickup tine.

7. The torsional gyroscope of claim 6 wherein the pickup tine and the drive tine are configured such that the angular rotation of the drive mass about the third axis induces angular rotation of the pickup tine that induces an electric displacement field in the pickup tine.

8. The torsional gyroscope of claim 7 wherein the pickup tine is configured such that the electrical charge induced on the plurality of pickup electrodes is proportional to an angular rotation rate of the drive mass about the third axis.

9. A planar three-dimensional inertial sensor system comprising:
a first gyroscopic sensor configured to measure rotation about a first axis of rotation;
a second gyroscopic sensor configured to measure rotation about a second axis of rotation; and
a torsional gyroscopic sensor configured to measure rotation about a third axis of rotation; wherein the first gyroscopic sensor, the second gyroscopic sensor, and the torsional gyroscopic sensor are disposed along a same plane, and wherein the torsional gyroscopic sensor comprises:
a drive tine having a length along a first axis, the drive tine comprising a piezoelectric material;
a pickup tine having a length along a second axis, the pickup tine comprising a piezoelectric material, the pickup tine being transverse to the drive tine, the drive tine having a first end attached to the pickup tine; a plurality of pickup electrodes disposed along the pickup tine;
a plurality of drive electrodes disposed along the drive tine;
a drive mass attached to a second end of the drive tine opposite the first end of the drive tine, wherein the plurality of drive electrodes and the drive tine are configured such that an electric field applied to the plurality of drive electrodes induces a rotational oscillation of the drive tine such that the drive tine rotates about the first axis, inducing the drive mass to rotate about the first axis; and wherein angular rotation of the drive tine about a third axis induces a torque in the pickup tine that induces an electric field in the pickup tine that induces an electrical charge to build up in the plurality of pickup electrodes.

10. The planar three-dimensional inertial sensor system of claim 9 wherein at least one of the first gyroscopic sensor and the second gyroscopic sensor is a tuning fork gyroscopic sensor.

11. The planar three-dimensional inertial sensor system of claim 9 wherein the torsional gyroscopic sensor is configured to measure the angular rotation of the drive mass induced into the rotational oscillation about the first axis of rotation, the torsional gyroscopic sensor being configured to measure the angular rotation about the third axis of rotation.

12. A torsional gyroscope comprising:
a pickup frame having a central opening; an anchor point disposed within the central opening of the pickup frame;
a plurality of pickup beams connecting the pickup frame to the anchor point, the pickup beams comprising a piezoelectric material;
a plurality of pickup electrodes attached to the pickup beams; a drive frame having a central opening, the pickup frame being disposed within the central opening of the drive frame; a plurality of drive beams, the drive beams connecting the drive frame to the pickup frame, the drive beams comprising a piezoelectric material; and
a plurality of drive electrodes disposed on the drive beams, wherein the drive beams and the plurality of drive electrodes are configured such that applying an electric field to the plurality of drive electrodes induces a rotational oscillation of the drive beams about a first axis, the rotational oscillation of the drive beams inducing the drive frame to rotate about the first axis;
wherein angular rotation of the drive frame about a third axis induces a torque about a second axis, the torque being applied to the pickup frame induces a strain in the pickup frame that induces an electric displacement field in the pickup frame that in turn induces an electric charge to build up in the plurality of pickup electrodes.

13. The torsional gyroscope of claim 12 wherein the piezoelectric material comprise at least one of the drive beams and the pickup beams is quartz.

14. The torsional gyroscope of claim 12 wherein the drive beams have a rectilinear cross-section, and wherein a drive electrode of the plurality of drive electrodes is disposed at each corner of the rectilinear cross-section.

15. The torsional gyroscope of claim 14 wherein the drive beams and the plurality of drive electrodes are configured such that the electric field applied to the plurality of drive electrodes induces a mechanical shear in the piezoelectric material comprising the drive beams.

16. The torsional gyroscope of claim 15 wherein the drive beams and the plurality of drive electrodes are configured such that the electric field applied to the plurality of drive electrodes induces the drive beams to rotate about a centroid of the rectilinear cross-section of each of the drive beams.

17. The torsional gyroscope of claim 12 wherein the pickup beams have a rectilinear cross-section, and wherein a pickup electrode of the plurality of pickup electrodes is disposed on each side of the rectilinear cross-section of the pickup beams.

18. The torsional gyroscope of claim 17 wherein the pickup beams and the drive frame are configured such that the angular rotation of the drive frame about the third axis induces angular rotation of the pickup beams that induces the electric displacement field in the pickup beams.

19. The torsional gyroscope of claim 12 wherein the pickup beams comprise a plurality of beams oriented such that the plurality of beams are oriented according to a crystalline structure of the piezoelectric material of the plurality of beams.

20. The torsional gyroscope of claim 19 wherein the plurality of beams are oriented to cancel at least a portion of anisotropic properties of the piezoelectric material comprising the plurality of beams.

21. The torsional gyroscope of claim 19 wherein the plurality of beams comprises crystalline quartz and the plurality of beams are oriented along an X crystalline axis of the crystalline quartz.

22. The torsional gyroscope of claim 19 wherein the plurality of beams comprise crystalline quartz and the plurality of beams are aligned with the crystalline structure of the crystalline quartz to reduce torsion of the plurality of beams along a second axis of rotation.

23. A differential torsional gyroscopic sensor comprising:
a first drive tine having a length along a first axis, the first drive tine comprising a first piezoelectric material;
a first pickup tine having a length along a second axis, the first pickup tine comprising a second piezoelectric material, the first pickup tine being transverse to the first drive tine, the first drive tine having a first end attached to the first pickup tine;
a plurality of first pickup electrodes disposed along the first pickup tine;
a plurality of first drive electrodes disposed along the first drive tine;
a first drive mass attached to a second end of the first drive first tine opposite the first end of the first drive tine;
a second drive tine having a length along the first axis, the second drive tine comprising a third piezoelectric material;
a second pickup tine having a length along the second axis, the second pickup tine comprising a fourth piezoelectric material, the second pickup tine being transverse to the second drive tine, the second drive tine having a first end attached to the second pickup tine;
a plurality of second pickup electrodes disposed along the second pickup tine;
a plurality of second drive electrodes disposed along the second drive tine; and
a second drive mass attached to a second end of the second drive tine opposite the first end of the second drive tine; wherein the first pickup tine and the second pickup tine share a common anchor point;
wherein the plurality of first drive electrodes and the first drive tine are configured such that an electric field applied to the plurality of first drive electrodes induces a rotational oscillation of the first drive tine such that the first drive tine rotates about the first axis, inducing the first drive mass to rotate about the first axis;
wherein angular rotation of the first drive tine about a third axis induces a torque in the first pickup tine that induces an electric field in the first pickup tine that induces an electrical charge to build up in the plurality of first pickup electrodes;
wherein the second drive electrodes and the second drive tine are configured such that an electric field applied to the second drive electrodes induces a rotational oscillation of the second drive tine such that the second drive tine rotates about the first axis, inducing the second drive mass to rotate about the first axis; and
wherein displacement of the second drive tine along a third axis induces a torque in the second pickup tine that induces an electric field in the second pickup tine that induces an electrical charge to build up in the second pickup electrodes.

24. The sensor of claim 23 wherein the first, second, third, and fourth piezoelectric materials comprise the same piezoelectric material.

25. The sensor of claim 23 wherein the first drive tine has a rectilinear cross-section, and wherein a drive electrode of the plurality of first drive electrodes is disposed at each corner of the rectilinear cross-section.

26. The sensor of claim 25 wherein the first drive tine and the plurality of first drive electrodes are configured such that the electric field applied to the plurality of first drive electrodes induces a mechanical shear in the piezoelectric material comprising the first drive tine.

27. The sensor of claim 26 wherein the first drive tine and the plurality of first drive electrodes are configured such that the electric field applied to the plurality of first drive electrodes induces the first drive tine to rotate about a centroid of the rectilinear cross-section of the first drive tine.

28. The sensor of claim 23 wherein the first pickup tine has a rectilinear cross-section, and wherein a pickup electrode of the plurality of first pickup electrodes is disposed on each side of the rectilinear cross-section of the first pickup tine.

29. The sensor of claim 28 wherein the first pickup tine and the first drive tine are configured such that the angular rotation of the first drive mass about the third axis induces angular rotation of the first pickup tine that induces an electric displacement field in the first pickup tine.

30. The sensor of claim 23 wherein the first drive tine and the second drive tine are configured such that applying an electrical field to the plurality of first drive electrodes and the second drive electrodes induces the rotational oscillation of the first drive tine in a first direction and the second drive tine in a second direction opposite the first direction.

* * * * *